(12) United States Patent
Inoue

(10) Patent No.: US 9,020,739 B2
(45) Date of Patent: Apr. 28, 2015

(54) CONTROL DEVICE FOR INTERNAL COMBUSTION ENGINE HAVING AN EXTERNAL EXHAUST GAS RECIRCULATION SYSTEM

(75) Inventor: Masahiro Inoue, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1167 days.

(21) Appl. No.: 12/999,935

(22) PCT Filed: Nov. 11, 2009

(86) PCT No.: PCT/JP2009/069219
§ 371 (c)(1),
(2), (4) Date: Dec. 17, 2010

(87) PCT Pub. No.: WO2011/058628
PCT Pub. Date: May 19, 2011

(65) Prior Publication Data
US 2011/0160984 A1  Jun. 30, 2011

(51) Int. Cl.
*F02D 41/00* (2006.01)
*F02D 41/14* (2006.01)
*F02M 25/07* (2006.01)
*F02B 37/02* (2006.01)
*F01N 13/10* (2010.01)

(52) U.S. Cl.
CPC ........ *F02D 41/0052* (2013.01); *F02D 41/1441* (2013.01); *F02D 41/1475* (2013.01); *F02D 2041/1419* (2013.01); *F02M 25/0707* (2013.01); *F02M 25/0727* (2013.01); *F02M 25/074* (2013.01); *Y02T 10/47* (2013.01); *F02B 37/025* (2013.01); *F02M 25/0755* (2013.01); *F02D 41/1454* (2013.01); *F02M 25/0756* (2013.01); *F02D 41/1456* (2013.01); *F01N 13/107* (2013.01)

(58) Field of Classification Search
CPC ........... F02M 25/0707; F02M 25/074; F02M 25/0748; F02M 25/0755
USPC ................ 123/568.11–21; 60/605.2; 701/108
See application file for complete search history.

(56) References Cited

U.S. PATENT DOCUMENTS 5,551,408 A * 9/1996 Shimizu et al. ............... 123/679
5,946,906 A * 9/1999 Akazaki et al. ................. 60/278

(Continued)

FOREIGN PATENT DOCUMENTS

JP 05-187327 A 7/1993
JP 2001-349231 A 12/2001

(Continued)

*Primary Examiner* — Lindsay Low
*Assistant Examiner* — Robert Werner
(74) *Attorney, Agent, or Firm* — Kenyon & Kenyon LLP

(57) ABSTRACT

Disclosed is a control device for an internal combustion engine that is used with an internal combustion engine having an EGR catalyst and an EGR valve in an EGR path for connecting an exhaust path to an intake path, and capable of preventing the purification performance of the EGR catalyst from being degraded during EGR stoppage and purifying exhaust gas in a preferred manner upon EGR resumption. When EGR is stopped with the EGR valve closed, the control device judges whether an EGR path air-fuel ratio is richer than a threshold value. If the EGR path air-fuel ratio is judged to be richer than the threshold value, the control device sets a target air-fuel ratio for the internal combustion engine to be leaner than a stoichiometric air-fuel ratio.

12 Claims, 7 Drawing Sheets

(56) References Cited

U.S. PATENT DOCUMENTS

| | | | |
|---|---|---|---|
| 6,067,800 A * | 5/2000 | Kolmanovsky et al. | 60/602 |
| 6,516,772 B2 * | 2/2003 | Ueno et al. | 123/295 |
| 6,732,524 B2 * | 5/2004 | Sponton | 60/605.2 |
| 6,782,695 B2 * | 8/2004 | Lutz et al. | 60/285 |
| 7,555,895 B2 * | 7/2009 | Shirakawa et al. | 60/277 |
| 7,681,560 B2 * | 3/2010 | Yamaoka et al. | 123/568.11 |
| 2006/0016180 A1 * | 1/2006 | Tomita et al. | 60/297 |

FOREIGN PATENT DOCUMENTS

| | | |
|---|---|---|
| JP | 2007-023888 A | 2/2007 |
| JP | 2007-120455 A | 5/2007 |
| JP | 2009-174452 A | 8/2009 |

* cited by examiner

CONTROL DEVICE FOR INTERNAL COMBUSTION ENGINE HAVING AN EXTERNAL EXHAUST GAS RECIRCULATION SYSTEM

This is a 371 national phase application of PCT/JP2009/069219 filed 11 Nov. 2009, the content of which is incorporated herein by reference.

TECHNICAL FIELD

The present invention relates to a control device for an internal combustion engine, and more particularly, to a control device for an internal combustion engine suitable for controlling an internal combustion engine mounted in a vehicle having an external exhaust gas recirculation (EGR) system.

BACKGROUND ART

In a known internal combustion engine, such as described, for instance, in Patent Document 1, listed below in paragraph [0003] an EGR path connects an exhaust path and an intake path, and an EGR catalyst and an EGR valve are disposed in the EGR path. The invention disclosed in this patent document changes a target air-fuel ratio from rich to lean if a threshold value is exceeded by the accumulated time during which the air-fuel ratio of exhaust gas flowing in the exhaust path is rich when EGR (exhaust gas recirculation) is provided with the EGR valve open. According to control exercised in the above situation, the EGR catalyst can be regenerated while EGR is provided.

PRIOR ART LITERATURE

Patent Documents

Patent Document 1: JP-A-2009-174452
Patent Document 2: JP-A-2007-023888
Patent Document 3: JP-A-5-187327

SUMMARY OF THE INVENTION

Problem to be Solved by the Invention

Meanwhile, the exhaust gas pulsates due to the influence of the pressure wave caused by exhaust blowdown. Therefore, when EGR is stopped with the EGR valve closed, the inflow and outflow of exhaust gas repeatedly occur between the exhaust path and the EGR path. In particular, in a situation where a twin-entry turbo having an exhaust path individually for each cylinder group is provided, the exhaust gas pulsates significantly because the number of cylinder explosions per exhaust path is small. Therefore, significant gas exchange occurs between the exhaust path and the EGR path. Consequently, the inflow and outflow of exhaust gas repeatedly occur also in the EGR catalyst placed in the EGR path. When the exhaust gas is rich, the EGR catalyst's oxygen is consumed to degrade the purification performance of the EGR catalyst. If EGR resumes when the EGR catalyst's purification performance is degraded, exhaust gas components (PM (particulate matter) in particular) are not sufficiently purified. As a result, it is concerned that many exhaust gas components may flow into an intake system to degrade the exhaust gas purification performance of the internal combustion engine.

The present invention has been made to solve the above-mentioned problem. An object of the present invention is to provide an internal combustion engine control device that is capable of preventing the EGR catalyst's purification performance from being degraded during EGR stoppage and purifying the exhaust gas in a preferred manner upon EGR resumption.

Means for Solving the Problem

First aspect of the present invention is a control device for an internal combustion engine, comprising:
an EGR path that connects an exhaust path and an intake path of the internal combustion engine;
an EGR catalyst that is disposed in the EGR path and capable of purifying exhaust gas;
an EGR valve that opens and closes the EGR path;
means for acquiring an exhaust gas air-fuel ratio in the EGR path (hereinafter referred to as the EGR path air-fuel ratio);
EGR path air-fuel ratio judgment means for judging whether the EGR path air-fuel ratio is richer than a threshold value when EGR is stopped with the EGR valve closed; and
target air-fuel ratio setup means for setting a target air-fuel ratio for the internal combustion engine to be leaner than a stoichiometric air-fuel ratio when the EGR path air-fuel ratio judgment means concludes that the EGR path air-fuel ratio is richer than the threshold value.

Second aspect of the present invention is a control device for an internal combustion engine according to the first aspect, wherein the EGR path air-fuel ratio is an air-fuel ratio prevailing upstream of the EGR valve.

Third aspect of the present invention is a control device for an internal combustion engine according to the first or the second aspect, further comprising means for selecting a stoichiometric target air-fuel ratio for the internal combustion engine when the EGR path air-fuel ratio judgment means concludes that the EGR path air-fuel ratio is leaner than the threshold value after the target air-fuel ratio is set by the target air-fuel ratio setup means.

Fourth aspect of the present invention is a control device for an internal combustion engine according to any one of the first to the third aspects, further comprising:
a main catalyst that is disposed in the exhaust path and capable of purifying the exhaust gas;
means for acquiring an exhaust gas air-fuel ratio prevailing downstream of the main catalyst (hereinafter referred to as the main catalyst downstream air-fuel ratio); and
main catalyst downstream air-fuel ratio judgment means for judging whether the main catalyst downstream air-fuel ratio is richer than the stoichiometric air-fuel ratio,
wherein the target air-fuel ratio setup means sets the target air-fuel ratio for the internal combustion engine to be leaner than the stoichiometric air-fuel ratio when the EGR path air-fuel ratio judgment means concludes that the EGR path air-fuel ratio is richer than the threshold value and the main catalyst downstream air-fuel ratio judgment means concludes that the main catalyst downstream air-fuel ratio is richer than the stoichiometric air-fuel ratio.

Fifth aspect of the present invention is a control device for an internal combustion engine according to any one of the first to the fourth aspects, further comprising:
a turbine for a supercharger installed in the exhaust path,
wherein the EGR path is connected to the exhaust path positioned upstream of the turbine.

Sixth aspect of the present invention is a control device for an internal combustion engine according to the fifth aspect, wherein the exhaust path includes a first exhaust path in which an exhaust gas discharged from a first cylinder group of the internal combustion engine flows, a second exhaust path in which an exhaust gas discharged from a second cylinder group of the internal combustion engine flows, and a merged exhaust path formed by merging the first exhaust path with the second exhaust path;

wherein the turbine is installed in the merged exhaust path;

wherein the EGR path includes a first EGR path that is connected to the first exhaust path and then routed to the intake path of the internal combustion engine, a second EGR path that is connected to the second exhaust path and then routed to the intake path of the internal combustion engine, and a merged EGR path that begins with a merge point between the first EGR path and the second EGR path and communicates with the intake path; and wherein the EGR catalyst is installed in the merged EGR path.

Effect of the Invention

According to the first aspect of the present invention, the target air-fuel ratio of the internal combustion engine is set to be lean when EGR is stopped and the EGR path air-fuel ratio is richer than the threshold value. Gas exchange occurs between the exhaust path and the EGR path due to exhaust gas pulsation. When the EGR valve is disposed downstream of the EGR catalyst, oxygen can be supplied to the EGR catalyst because of a lean exhaust gas that flows into the EGR path. The amount of oxygen in the EGR catalyst can be increased to prevent the purification performance of exhaust gas components (PM in particular) from being degraded. Further, when the EGR valve is disposed upstream of the EGR catalyst, the first aspect of the present invention ensures that the exhaust gas in the EGR path is lean when EGR is stopped. Therefore, when EGR resumes, it is possible to prevent a rich exhaust gas flowing into the EGR catalyst from degrading the purification performance of the EGR catalyst. As described above, the first aspect of the present invention makes it possible to purify the exhaust gas components in the EGR catalyst in a preferred manner when EGR resumes, and prevent the exhaust gas components from being excessively discharged into the intake system.

According to the second aspect of the present invention, the air-fuel ratio in the EGR path positioned upstream of the EGR valve is acquired. Therefore, when the air-fuel ratio prevailing downstream of the EGR catalyst disposed upstream of the EGR valve is acquired, oxygen can be supplied to the EGR catalyst after verifying that the EGR catalyst is short of oxygen. Further, when the EGR valve is disposed upstream of the EGR catalyst, the exhaust gas in the EGR path can be made lean after estimating that the EGR catalyst is short of oxygen when EGR resumes.

According to the third aspect of the present invention, the stoichiometric air-fuel ratio is set as the target air-fuel ratio of the internal combustion engine when the EGR path air-fuel ratio is judged to be leaner than the threshold value after the target air-fuel ratio is set by the target air-fuel ratio setup means. Therefore, the third aspect of the present invention makes it possible to prevent emissions from being degraded.

According to the fourth aspect of the present invention, the target air-fuel ratio of the internal combustion engine is set to be lean when EGR is stopped, the EGR path air-fuel ratio is richer than the threshold value, and the main catalyst downstream air-fuel ratio is richer than the stoichiometric air-fuel ratio. Therefore, the fourth aspect of the present invention makes it possible to maintain the purification performance of the EGR catalyst while preventing emissions from being degraded.

According to the fifth aspect of the present invention, the EGR path is connected to the exhaust path positioned upstream of the turbine of the supercharger. Significant pressure changes occur upstream of the turbine. As the EGR path is connected to a place where significant pressure changes occur, significant gas exchange occurs between the exhaust path and the EGR path. Consequently, control provided by the first to fourth aspects of the present invention effectively works so that the fifth aspect of the present invention can prevent the purification performance of the EGR catalyst from being degraded.

According to the sixth aspect of the present invention, a twin-entry turbo having an exhaust path individually for each cylinder group is configured. As the exhaust path is branched, the number of cylinder explosions per branched exhaust path is decreased. Therefore, the exhaust gas pulsates significantly. Consequently, control provided by the first to fourth aspects of the present invention effectively works so that the sixth aspect of the present invention can prevent the purification performance of the EGR catalyst from being degraded.

Figure 1:
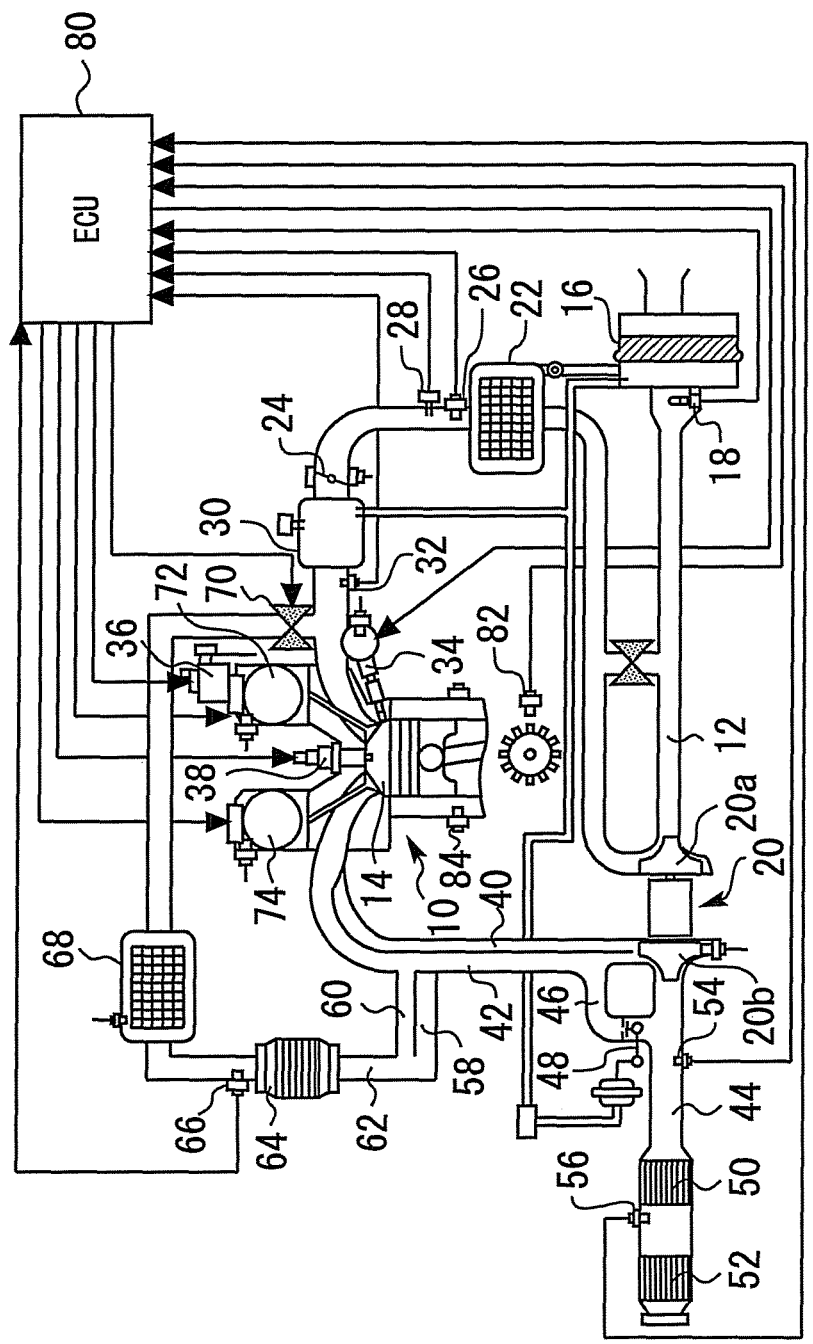
FIG. 1 is schematic diagrams illustrating the configuration of a system according to a first embodiment of the present invention.

10 internal combustion engine
12 intake path
20, 22a, 22b, turbocharger, compressor, turbine
40, 42 first exhaust path, second exhaust path
44 merged exhaust path
50 upstream catalyst (SC)
54 air-fuel ratio sensor
56 oxygen sensor
58, 60 first EGR path, second EGR path
62 merged EGR path
64 EGR catalyst
66 EGR path oxygen sensor
70 EGR valve
80 ECU
90a turbine inflow gas
92a EGR path inflow gas
94a EGR catalyst inflow gas
99 threshold value

MODE FOR CARRYING OUT THE INVENTION

An embodiment of the present invention will now be described in detail with reference to the accompanying drawings. Like elements in the drawings are designated by like reference numerals and will not be redundantly described.

First Embodiment

[System Configuration of First Embodiment]

Figure 2:
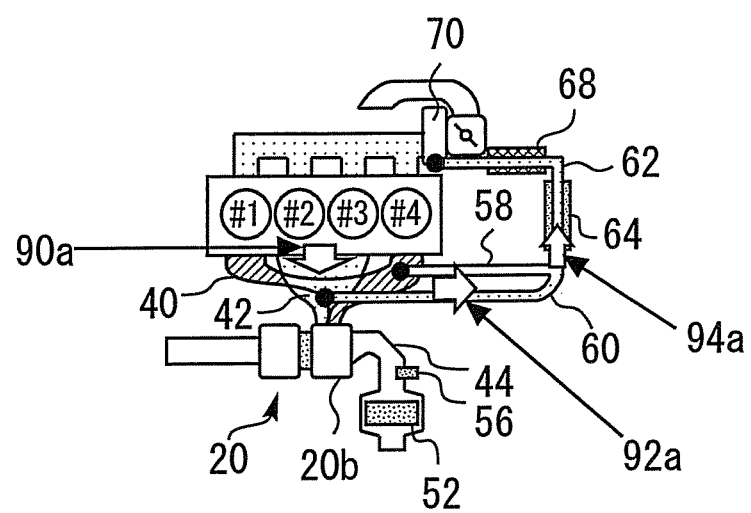
FIG. 2 is schematic diagrams illustrating the configuration of a system according to a first embodiment of the present invention.

FIGS. 1 and 2 are schematic diagrams illustrating the configuration of a system according to a first embodiment of the present invention. More specifically, FIG. 1 shows a cross-section of a cylinder of an internal combustion engine 10 having four cylinders. FIG. 2 shows various system elements, which are depicted in FIG. 1, in a simplified manner. The system configuration of the first embodiment is described below with reference as needed to FIGS. 1 and 2.

An intake system for the internal combustion engine 10 includes an intake path 12. Air is taken into the intake path 12 from the atmosphere and delivered to a combustion chamber 14. An air cleaner 16 is installed at the inlet of the intake path 12. An air flow meter 18 is installed downstream of the air cleaner 16 to output a signal according to the flow rate of air taken into the intake path 12.

A turbocharger 20 is installed downstream of the air flow meter 18. The turbocharger 20 includes a compressor 20a and a turbine 20b. The compressor 20a and the turbine 20b are integrally coupled with a connecting shaft. The compressor 20a is rotationally driven by exhaust energy of exhaust gas input into the turbine 20b.

An intercooler 22 is installed downstream of the compressor 20a to cool compressed air. A throttle valve 24 is disposed downstream of the intercooler 22. The throttle valve 24 is an electronically controlled valve that is driven by a throttle motor in accordance with an accelerator opening.

An intake air temperature sensor 26 and an upstream pressure sensor 28 are disposed in the middle of the intake path 12 between the intercooler 22 and the throttle valve 24. The intake air temperature sensor 26 detects the temperature of intake air cooled by the intercooler 22. The upstream pressure sensor 28 detects an intake path internal pressure that prevails downstream of the compressor 20a and upstream of the throttle valve 24. A surge tank 30 is installed downstream of the throttle valve 24. The surge tank 30 is provided with a downstream pressure sensor 32, which detects an intake path internal pressure prevailing downstream of the throttle valve 24.

Further, the internal combustion engine 10 includes a direct injection valve 34, which directly injects fuel into the combustion chamber 14. Fuel pressurized by a high-pressure fuel pump 36 is supplied to the direct injection valve 34. The internal combustion engine 10 also includes a spark plug 38, which projects into the combustion chamber 14.

As shown in FIG. 2, the internal combustion engine 10 includes a first exhaust path 40 and a second exhaust path 42. Exhaust gas discharged from a first cylinder group, which includes a first cylinder and a fourth cylinder, flows into the first exhaust path 40. Exhaust gas discharged from a second cylinder group, which includes a second cylinder and a third cylinder, flows into the second exhaust path 42. The first and second exhaust paths 40 and 42 merge upstream of the turbine 20b to form a merged exhaust path 44. As such a configuration is employed, the turbocharger 20 functions as a "twin-entry turbo." When the first exhaust path 40, the second exhaust path 42, and the merged exhaust path 44 are not specifically distinguished from each other, they are simply referred to as the "exhaust path."

As shown in FIG. 1, an exhaust system for the internal combustion engine 10 is connected to an exhaust bypass path 46, which bypasses the turbine 20b to establish a connection between the inlet and outlet of the turbine 20b. A wastegate valve (WGV) 48 is disposed in the middle of the exhaust bypass path 46.

An upstream catalyst (SC) 50 and a downstream catalyst (UFC) 52, which purify the exhaust gas, are serially disposed in the merged exhaust path, 44 that is positioned downstream of the turbine 20b. Three-way catalysts may be used as these catalysts 50 and 52. An air-fuel ratio sensor 54 is disposed upstream of the upstream catalyst 50 to detect an exhaust air-fuel ratio that prevails upstream of the upstream catalyst 50. In addition, an oxygen sensor 56 is disposed between the upstream catalyst 50 and the downstream catalyst 52. The oxygen sensor 56 generates a signal that varies depending on whether the air-fuel ratio prevailing between the upstream catalyst 50 and the downstream catalyst 52 is rich or lean.

Further, the exhaust system for the internal combustion engine 10 includes a first EGR path 58 and a second EGR path 60. The first EGR path 58 is connected to the first exhaust path 40 and then routed to the intake path 12. The second EGR path 60 is connected to the second exhaust path 42 and then routed to the intake path 12. The first and second EGR paths 58 and 60 merge to form a merged EGR path 62, which is connected to the intake path 12.

An EGR catalyst 64, which serves as an oxidation catalyst, is installed in the middle of the merged EGR path 62. The merged EGR path 62 positioned between the EGR catalyst 64 and the intake path 12 is provided with an EGR path oxygen sensor 66. The merged EGR path 62 positioned between the EGR path oxygen sensor 66 and the intake path 12 is provided with an EGR cooler 68. The EGR cooler 68 cools the exhaust gas flowing in the merged EGR path 62 by using an engine cooling water. Further, the merged EGR path 62 positioned downstream of the EGR cooler 68 is provided with an EGR valve 70, which controls the flow rate of EGR gas. When the first EGR path 58, the second EGR path 60, and the merged EGR path 62 are not specifically distinguished from each other, they are simply referred to as the "EGR path."

The system according to the present embodiment includes an intake variable valve train 72 and an exhaust variable valve train 74, which respectively drive intake valves and exhaust valves of the cylinders. It is assumed that these variable valve trains 72 and 74 each include a VVT mechanism for adjusting the opening/closing timing of the intake valves and exhaust valves.

[General Control in First Embodiment]

A control system for the internal combustion engine 10 includes an ECU (electronic control unit) 80. The ECU 80 has an input section connected not only to the above-mentioned sensors but also to various other sensors such as a crank angle sensor 82 for detecting the speed of the engine and a water temperature sensor 84 for detecting the temperature of cooling water. The ECU 80 has an output section connected to the above-mentioned actuators and various other actuators. The ECU 80 controls the operating status of the internal combustion engine 10 in accordance with various items of input information.

Figure 3:
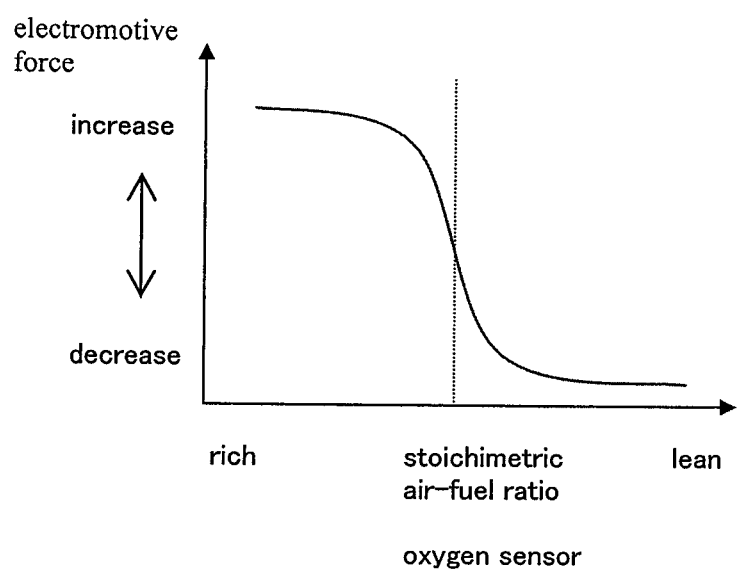
FIG. 3 is a graph illustrating the output characteristics of the oxygen sensor 56 and EGR path oxygen sensor 66, which are used in the present embodiment.

FIG. 3 is a graph illustrating the output characteristics of the oxygen sensor 56 and EGR path oxygen sensor 66, which are used in the present embodiment. As shown in FIG. 3, the electromotive force output by the oxygen sensors 56 and 66 increases with an increase in the richness of the air-fuel ratio and decreases with an increase in the leanness of the air-fuel ratio. In the vicinity of a stoichiometric air-fuel ratio (e.g., 14.6), the electromotive force drastically decreases as the air-fuel ratio becomes leaner. The oxygen sensors 56 and 66 make it possible to accurately determine whether the air-fuel ratio of the exhaust gas is richer or leaner than the stoichiometric air-fuel ratio.

The ECU 80 determines a base fuel injection amount according to the operating status of the internal combustion engine 10 by using a predetermined map that is based on the load on the internal combustion engine 10 and the engine speed. The system according to the present embodiment then exercises main feedback control in accordance with the output of the upstream air-fuel ratio sensor 54, and exercises sub feedback control in accordance with the output of the downstream oxygen sensor 56. In main feedback control, the base fuel injection amount is corrected (increased or decreased) so that the actual air-fuel ratio of the exhaust gas flowing into the upstream catalyst 50 agrees with a predetermined target air-fuel ratio (e.g., stoichiometric air-fuel ratio). In sub feedback control, the contents of main feedback control are corrected so that the air-fuel ratio of the exhaust gas flowing downstream of the upstream catalyst 50 agrees with the stoichiometric air-fuel ratio, or more specifically, the output of the oxygen sensor 56 disposed downstream of the upstream catalyst 50 agrees with a stoichiometric output.

The ECU 80 sets the opening of the EGR valve 70 to control the operating status of the internal combustion engine 10 in accordance with the various items of input information. Opening the EGR valve 70 in compliance with a demand provides EGR (exhaust gas recirculation) in such a manner that part of the exhaust gas flowing in the first and second exhaust paths 40 and 42 flows back to the intake path 12 through the first EGR path 58, the second EGR path 60, and the merged EGR path 62. Further, an EGR cut operation can be performed to stop the EGR by fully closing the EGR valve 70 in compliance with a demand.

[Characteristic Control in First Embodiment]

Figure 7:
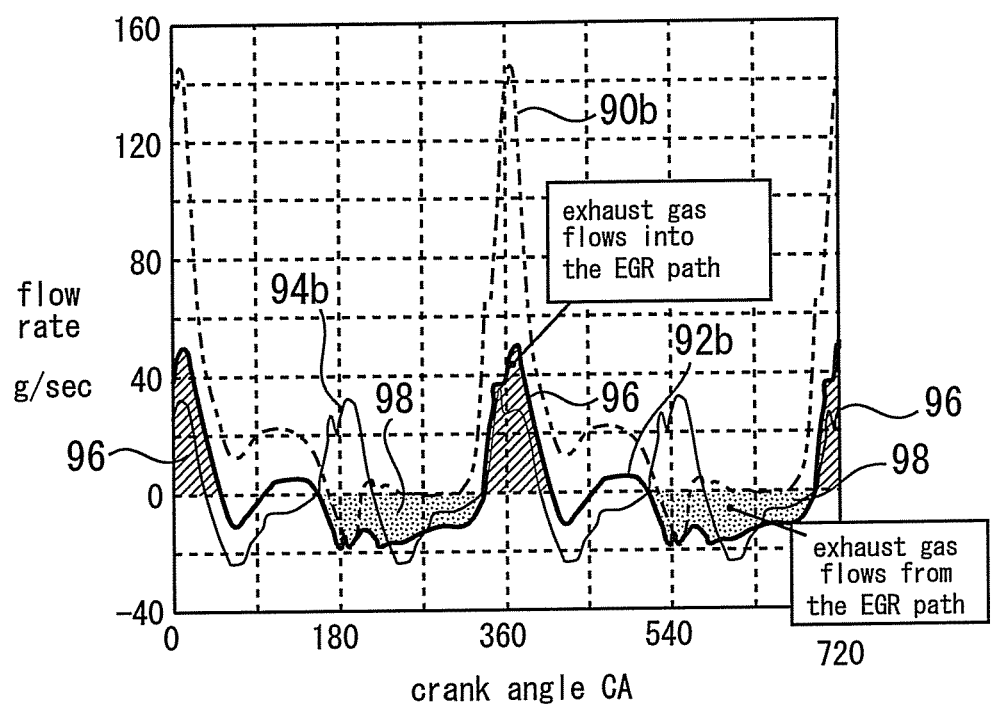
FIG. 7 is a graph illustrating exhaust gas flow rates prevailing in the exhaust path, EGR path, and EGR catalyst 64 during an EGR cut operation.

FIG. 7 is a graph illustrating exhaust gas flow rates prevailing in the exhaust path, EGR path, and EGR catalyst 64 during an EGR cut operation. Solid line 90*b* indicates the flow rate of an exhaust gas flowing into the turbine 20*b* (a turbine inflow gas 90*a* shown in FIG. 2). Solid line 92*b* indicates the flow rate of an exhaust gas flowing into the EGR path (an EGR path inflow gas 92*a* shown in FIG. 2). Solid line 94*b* indicates the flow rate of an exhaust gas flowing into the EGR catalyst 64 (an EGR catalyst inflow gas 94*a* shown in FIG. 2).

A region 96 in which the solid line 92*b* shown in FIG. 7 indicates a positive value represents a state where an exhaust gas flows into the EGR path from the exhaust path. When an exhaust valve opens even while an EGR cut operation is performed with the EGR valve 70 fully closed, the pressures prevailing in exhaust gas outlets at upstream ends of the first and second EGR paths 58 and 60 increase. Thus, the exhaust gas flows into the EGR path, causing mass transfer. Consequently, the exhaust gas also flows into the EGR catalyst 64 as represented by a positive value indicated by the solid line 94*b*.

Meanwhile, a region 98 in which the solid line 92*b* shown in FIG. 7 indicates a negative value represents a state where an exhaust gas flows into the exhaust path from the EGR path. When the pressures prevailing in the exhaust gas outlets at the upstream ends of the first and second EGR paths 58 and 60 decrease due to exhaust gas pulsation, the exhaust gas flows into the exhaust path from the EGR path. Thus, the exhaust gas also flows out of the EGR catalyst 64 as represented by a negative value indicated by the solid line 94*b*.

In the system according to the present embodiment, the EGR path is connected to the exhaust path positioned upstream of the turbine 20*b*. As significant pressure changes occur upstream of the turbine, significant gas exchange occurs between the exhaust path and the EGR path. This increases the amounts of exhaust gas inflow and outflow relative to the EGR catalyst 64. Further, the aforementioned twin-entry turbo is configured in the system according to the present embodiment. In the twin-entry turbo in which an exhaust path is provided individually for each cylinder group, the number of cylinder explosions per branched exhaust path is decreased. Therefore, the exhaust gas pulsates more significantly. This further increases the amounts of exhaust gas inflow and outflow relative to the EGR catalyst 64.

As described above, the inflow and outflow of exhaust gas repeatedly occur relative to the EGR catalyst 64 even during an EGR cut operation. Therefore, if the exhaust gas air-fuel ratio is rich, the oxygen of the EGR catalyst 64 is consumed even during an EGR cut operation. If EGR resumes when the oxygen of the EGR catalyst 64 is consumed, PM (particulate matter) cannot be sufficiently purified by oxidation reaction. In such an instance, a large amount of PM flows back to the intake system.

Figure 4:
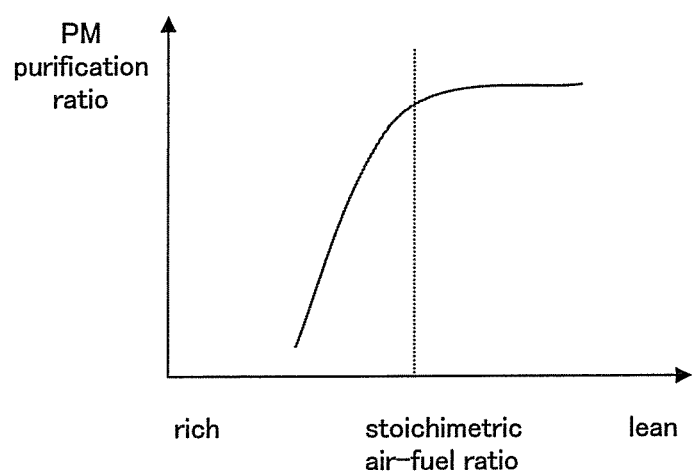
FIG. 4 is a graph illustrating the relationship between exhaust gas air-fuel ratio and PM purification efficiency.

FIG. 4 is a graph illustrating the relationship between exhaust gas air-fuel ratio and PM purification efficiency. As shown in FIG. 4, the PM purification efficiency is high in a region where the air-fuel ratio is leaner than the stoichiometric air-fuel ratio. Meanwhile, the PM purification efficiency drastically decreases in a region where the air-fuel ratio is richer than the stoichiometric air-fuel ratio.

As such being the case, if the air-fuel ratio of the exhaust gas flowing in the EGR path is rich during an EGR cut operation, the present embodiment exercises control so as to set a lean target air-fuel ratio.

Figure 5:
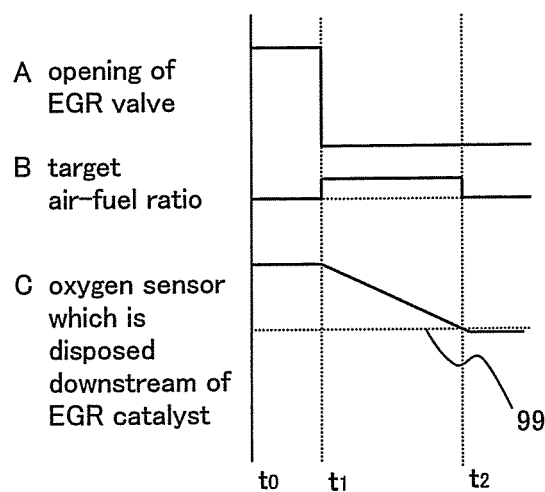
FIG. 5 is a timing diagram illustrating an example of control according to the first embodiment of the present invention.

The details of the above-mentioned control will now be summarized with reference to FIG. 5. FIG. 5 is a timing diagram illustrating an example of control according to the first embodiment of the present invention. Line A of FIG. 5 indicates the opening of the EGR valve 70. Line B of FIG. 5 indicates a target air-fuel ratio, which is set by the ECU 80. Line C of FIG. 5 indicates the output value (electromotive force) of the EGR path oxygen sensor 66, which is disposed downstream of the EGR catalyst 64. A threshold value 99 shown in the line C of FIG. 5 indicates an output value obtained, for instance, at a stoichiometric air-fuel ratio.

At time $t_0$, EGR is provided with the EGR valve 70 opened to a predetermined extent (the line A of FIG. 5). The indicated target air-fuel ratio is a stoichiometric air-fuel ratio (the line B of FIG. 5). At time $t_1$, an EGR cut operation is performed. As indicated in the line A of FIG. 5, the EGR valve 70 is fully closed during the EGR cut operation. In the above situation, the output value of the EGR path oxygen sensor 66, which is shown in the line C of FIG. 5, represents an air-fuel ratio richer than the threshold value 99. In this instance, the ECU 80 can conclude that the amount of oxygen in the EGR catalyst 64 is insufficient. The ECU 80 then changes the target air-fuel ratio from stoichiometric to lean (the line B of FIG. 5). It is assumed, for example, that the upper-limit setting for the target air-fuel ratio is 15. When the target air-fuel ratio is changed to be leaner, a lean exhaust gas flows into the EGR path and the EGR catalyst 64. After time $t_1$, the output value of the EGR path oxygen sensor 66 decreases. At time $t_2$, the output value of the EGR path oxygen sensor 66 decreases below the threshold value 99 (the line C of FIG. 5). The ECU 80 then concludes that the amount of oxygen in the EGR catalyst 64 is sufficient, and reverts to the stoichiometric target air-fuel ratio (the line B of FIG. 5).

(Control Routine)

Figure 6:
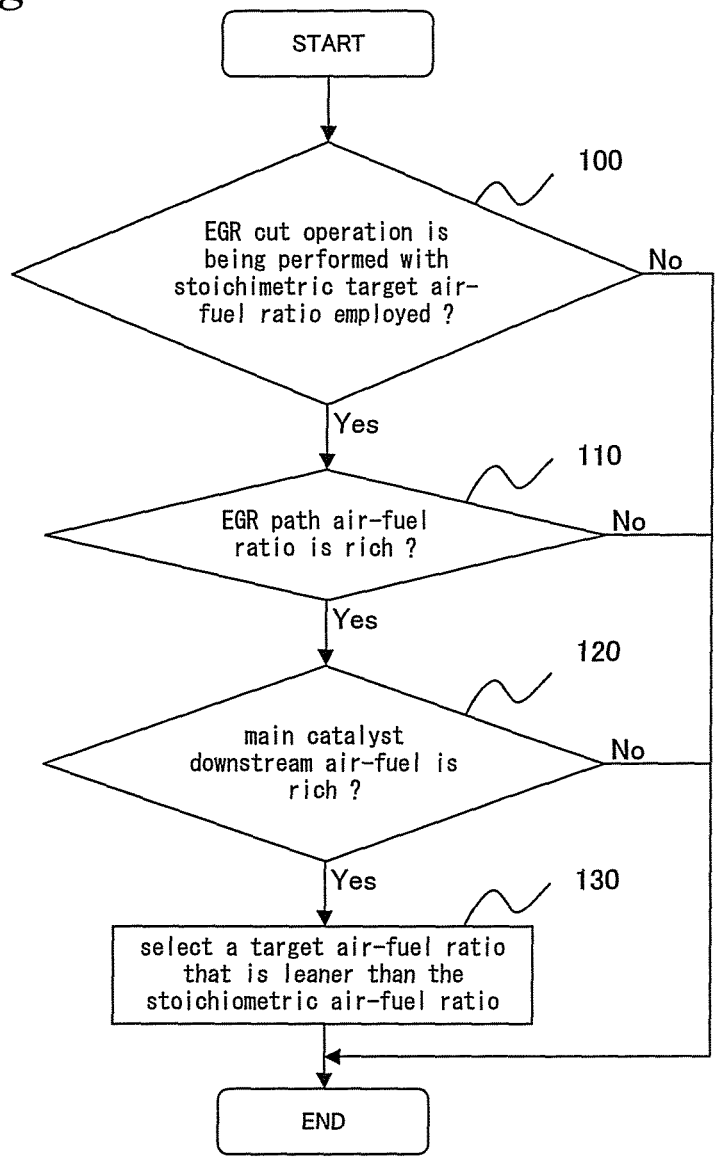
FIG. 6 is a flowchart illustrating a control routine that the ECU 80 executes to implement the above-described operation.

FIG. 6 is a flowchart illustrating a control routine that the ECU 80 executes to implement the above-described operation. First of all, the routine shown in FIG. 6 performs step 100 to judge whether an EGR cut operation is being performed with a stoichiometric target air-fuel ratio employed. If the EGR cut operation is not being performed or if the stoichiometric target air-fuel ratio is not employed, the routine terminates.

If, on the other hand, the EGR cut operation is being performed with the stoichiometric target air-fuel ratio employed, the routine proceeds to step 110, compares the output value of the EGR path oxygen sensor 66 against a threshold value, and judges whether the air-fuel ratio (hereinafter referred to as the EGR path air-fuel ratio) is rich. The threshold value is equivalent, for instance, to the stoichiometric air-fuel ratio. If the output value of the EGR path oxygen sensor 66 is higher than the threshold value, the routine concludes that the EGR path air-fuel ratio is rich. If the EGR path air-fuel ratio is not rich, the routine terminates.

If the EGR path air-fuel ratio is rich, the routine proceeds to step 120 and judges whether the air-fuel ratio prevailing downstream of the upstream catalyst 50 (hereinafter referred to as the main catalyst downstream air-fuel ratio) is rich. More specifically, the output value of the oxygen sensor 56 is checked to judge whether the main catalyst downstream air-fuel ratio is rich. The main catalyst downstream air-fuel ratio is judged to be rich when the output value of the oxygen sensor 56 is higher than a value equivalent to the stoichiometric air-fuel ratio. If the main catalyst downstream air-fuel ratio is not rich, the routine terminates.

If, on the other hand, the main catalyst downstream air-fuel ratio is rich, the routine proceeds to step 130 and causes the ECU 80 to switch from the above-described feedback control to open control and to select a target air-fuel ratio that is leaner than the stoichiometric air-fuel ratio. It is assumed, for example, that the upper-limit setting for the target air-fuel ratio is 15.

If the target air-fuel ratio is set to be lean in step 130, a subroutine to be described below is executed. First of all, the subroutine detects whether the output value of the EGR path oxygen sensor 66 is lower than the aforementioned threshold value. If the output value is lower than the threshold value, the ECU 80 concludes that the EGR path air-fuel ratio becomes lean, switches from the open control to the earlier-described feedback control, and reverts to the stoichiometric target air-fuel ratio. Subsequently, the subroutine terminates, causing the routine shown in FIG. 6 to terminate as well. It should be noted that the routine is executed periodically during an engine operation.

As described above, if the EGR path air-fuel ratio is rich during an EGR cut operation, the routine shown in FIG. 6 selects a lean target air-fuel ratio for the internal combustion engine. Therefore, a lean exhaust gas flowing into the EGR path can supply oxygen to the EGR catalyst 64. This increases the amount of oxygen in the EGR catalyst 64 to maintain its high purification performance. Further, if the main catalyst downstream air-fuel ratio, which prevails downstream of the upstream catalyst 50, is rich, the routine can refrain from exercising control to provide a lean target air-fuel ratio. This makes it possible to prevent emissions from being degraded.

As described above, the system according to the present embodiment can maintain high purification performance of the EGR catalyst 64 while preventing emissions from being degraded. Therefore, when EGR resumes, it is possible to purify PM in a preferred manner and prevent the exhaust gas components from being excessively discharged into the intake system. In particular, when the employed configuration includes a twin-entry turbo, significant exhaust gas pulsation occurs as described earlier. This ensures that control provided by the control routine shown in FIG. 6 works in a preferred manner.

Meanwhile, in the system according to the first embodiment described above, it is assumed that the EGR valve 70 and the EGR path oxygen sensor 66 are disposed downstream of the EGR catalyst 64. However, the present invention is not limited to such a disposition. For example, an alternative is to dispose the EGR valve 70 upstream of the EGR catalyst 64 and dispose the EGR path oxygen sensor 66 upstream of the EGR valve 70. If the EGR valve 70 is positioned apart from an exhaust path side joint of the EGR path because, for example, the EGR valve 70 and the EGR catalyst 64 are disposed on the intake path side of the EGR path, the EGR path may be filled with a large amount of rich gas. In such an instance, PM may not be sufficiently purified because the large amount of rich gas may flow into the EGR catalyst 64 when EGR resumes. However, when control is exercised as described above, the air-fuel ratio in the EGR path positioned upstream of the EGR valve 70 is detected even in the above case. Therefore, if the detected air-fuel ratio is rich, the target air-fuel ratio is set to be lean. This makes it possible to prevent the large amount of rich gas from flowing into the EGR catalyst 64, thereby inhibiting the purification performance of the EGR catalyst 64 from being degraded.

Further, in the system according to the first embodiment described above, it is assumed that the EGR valve 70 is disposed downstream of the EGR catalyst 64. However, the present invention is not limited to such a disposition of the EGR valve 70. For example, the EGR valve 70 may alternatively be disposed upstream of the EGR catalyst 64. When the EGR valve 70 is not sufficiently closed, control provided by the control routine shown in FIG. 6 works in a preferred manner.

In the first embodiment described above, the first EGR path 58, the second EGR path 60, and the merged EGR path 62 correspond to the "EGR path" according to the first aspect of the present invention; the EGR catalyst 64 corresponds to the "EGR catalyst" according to the first aspect of the present invention; the EGR valve 70 corresponds to the "EGR valve" according to the first aspect of the present invention; the EGR path air-fuel ratio sensor 66 corresponds to the "means for acquiring the EGR path air-fuel ratio" according to the first aspect of the present invention; the upstream catalyst 50 corresponds to the "main catalyst" according to the fourth aspect of the present invention; the oxygen sensor 56 corresponds to the "means for acquiring the main catalyst downstream air-fuel ratio" according to the fourth aspect of the present invention; the turbine 20b corresponds to the "turbine" according to the fifth aspect of the present invention; the first exhaust path 40 corresponds to the "first exhaust path" according to the sixth aspect of the present invention; the second exhaust path 42 corresponds to the "second exhaust path" according to the sixth aspect of the present invention; the merged exhaust path 44 corresponds to the "merged exhaust path" according to the sixth aspect of the present invention; the first EGR path 58 corresponds to the "first EGR path" according to the sixth aspect of the present invention; the second EGR path 60 corresponds to the "second EGR path" according to the sixth aspect of the present invention; and the merged EGR path 62 corresponds to the "merged exhaust path" according to the sixth aspect of the present invention.

Further, the "EGR path air-fuel ratio judgment means" according to the first aspect of the present invention is implemented when the ECU 80 performs step 110 described above; the "target air-fuel ratio setup means" according to the first or fourth aspect of the present invention is implemented when the ECU 80 performs steps 100 to 130 described above; and the "means for selecting a stoichiometric target air-fuel ratio"

according to the third aspect of the present invention is implemented when the above-described subroutine is executed.

The invention claimed is:

1. A control device for an internal combustion engine, comprising:
   an Exhaust Gas Recirculation (EGR) path that connects an exhaust path and an intake path of the internal combustion engine;
   an EGR catalyst that is disposed in the EGR path and capable of purifying exhaust gas;
   an EGR valve that opens and closes the EGR path, the EGR valve being disposed downstream of the EGR catalyst in the EGR path;
   an EGR path oxygen sensor that acquires an exhaust gas air-fuel ratio in the EGR path (hereinafter referred to as the EGR path air-fuel ratio), the EGR path oxygen sensor being disposed between the EGR catalyst and the EGR valve;
   EGR path air-fuel ratio judgment means for judging whether the EGR path air-fuel ratio is richer than a threshold value when EGR is stopped with the EGR valve closed; and
   target air-fuel ratio setup means for setting a target air-fuel ratio for the internal combustion engine to be leaner than a stoichiometric air-fuel ratio when the EGR path air-fuel ratio judgment means concludes that the EGR path air-fuel ratio is richer than the threshold value.

2. The control device for the internal combustion engine according to claim 1, wherein the EGR path air-fuel ratio is an air-fuel ratio prevailing upstream of the EGR valve.

3. The control device for the internal combustion engine according to claim 1, further comprising means for selecting a stoichiometric target air-fuel ratio for the internal combustion engine when the EGR path air-fuel ratio judgment means concludes that the EGR path air-fuel ratio is leaner than the threshold value after the target air-fuel ratio is set by the target air-fuel ratio setup means.

4. The control device for the internal combustion engine according to claim 1, further comprising:
   a main catalyst that is disposed in the exhaust path and capable of purifying the exhaust gas;
   means for acquiring an exhaust gas air-fuel ratio prevailing downstream of the main catalyst (hereinafter referred to as the main catalyst downstream air-fuel ratio); and
   main catalyst downstream air-fuel ratio judgment means for judging whether the main catalyst downstream air-fuel ratio is richer than the stoichiometric air-fuel ratio,
   wherein the target air-fuel ratio setup means sets the target air-fuel ratio for the internal combustion engine to be leaner than the stoichiometric air-fuel ratio when the EGR path air-fuel ratio judgment means concludes that the EGR path air-fuel ratio is richer than the threshold value and the main catalyst downstream air-fuel ratio judgment means concludes that the main catalyst downstream air-fuel ratio is richer than the stoichiometric air-fuel ratio.

5. The control device for the internal combustion engine according to claim 1, further comprising:
   a turbine for a supercharger installed in the exhaust path,
   wherein the EGR path is connected to the exhaust path positioned upstream of the turbine.

6. The control device for the internal combustion engine according to claim 5,
   wherein the exhaust path includes a first exhaust path in which an exhaust gas discharged from a first cylinder group of the internal combustion engine flows, a second exhaust path in which an exhaust gas discharged from a second cylinder group of the internal combustion engine flows, and a merged exhaust path formed by merging the first exhaust path with the second exhaust path;
   wherein the turbine is installed in the merged exhaust path;
   wherein the EGR path includes a first EGR path that is connected to the first exhaust path and then routed to the intake path of the internal combustion engine, a second EGR path that is connected to the second exhaust path and then routed to the intake path of the internal combustion engine, and a merged EGR path that begins with a merge point between the first EGR path and the second EGR path and communicates with the intake path; and
   wherein the EGR catalyst is installed in the merged EGR path.

7. A control device for an internal combustion engine, comprising:
   an Exhaust Gas Recirculation (EGR) path that connects an exhaust path and an intake path of the internal combustion engine;
   an EGR catalyst that is disposed in the EGR path and capable of purifying exhaust gas;
   an EGR valve that opens and closes the EGR path, the EGR valve being disposed downstream of the EGR catalyst in the EGR path;
   an EGR path oxygen sensor that acquires an exhaust gas air-fuel ratio in the EGR path (hereinafter referred to as the EGR path air-fuel ratio), the EGR path oxygen sensor being disposed between the EGR catalyst and the EGR valve;
   EGR path air-fuel ratio judgment device for judging whether the EGR path air-fuel ratio is richer than a threshold value when EGR is stopped with the EGR valve closed; and
   target air-fuel ratio setup device for setting a target air-fuel ratio for the internal combustion engine to be leaner than a stoichiometric air-fuel ratio when the EGR path air-fuel ratio judgment device concludes that the EGR path air-fuel ratio is richer than the threshold value.

8. The control device for the internal combustion engine according to claim 7, wherein the EGR path air-fuel ratio is an air-fuel ratio prevailing upstream of the EGR valve.

9. The control device for the internal combustion engine according to claim 7, further comprising a device for selecting a stoichiometric target air-fuel ratio for the internal combustion engine when the EGR path air-fuel ratio judgment device concludes that the EGR path air-fuel ratio is leaner than the threshold value after the target air-fuel ratio is set by the target air-fuel ratio setup device.

10. The control device for the internal combustion engine according to claim 7, further comprising:
   a main catalyst that is disposed in the exhaust path and capable of purifying the exhaust gas;
   a device for acquiring an exhaust gas air-fuel ratio prevailing downstream of the main catalyst (hereinafter referred to as the main catalyst downstream air-fuel ratio); and
   main catalyst downstream air-fuel ratio judgment device for judging whether the main catalyst downstream air-fuel ratio is richer than the stoichiometric air-fuel ratio,
   wherein the target air-fuel ratio setup device sets the target air-fuel ratio for the internal combustion engine to be leaner than the stoichiometric air-fuel ratio when the EGR path air-fuel ratio judgment device concludes that the EGR path air-fuel ratio is richer than the threshold value and the main catalyst downstream air-fuel ratio judgment device concludes that the main catalyst downstream air-fuel ratio is richer than the stoichiometric air-fuel ratio.

11. The control device for the internal combustion engine according to claim 7, further comprising:
- a turbine for a supercharger installed in the exhaust path,
- wherein the EGR path is connected to the exhaust path positioned upstream of the turbine.

12. The control device for the internal combustion engine according to claim 11,
- wherein the exhaust path includes a first exhaust path in which an exhaust gas discharged from a first cylinder group of the internal combustion engine flows, a second exhaust path in which an exhaust gas discharged from a second cylinder group of the internal combustion engine flows, and a merged exhaust path formed by merging the first exhaust path with the second exhaust path;
- wherein the turbine is installed in the merged exhaust path;
- wherein the EGR path includes a first EGR path that is connected to the first exhaust path and then routed to the intake path of the internal combustion engine, a second EGR path that is connected to the second exhaust path and then routed to the intake path of the internal combustion engine, and a merged EGR path that begins with a merge point between the first EGR path and the second EGR path and communicates with the intake path; and
- wherein the EGR catalyst is installed in the merged EGR path.

\* \* \* \* \*